3,646,216
Patented Feb. 29, 1972

3,646,216
**N¹-AMINOALKYL DERIVATIVES OF
2-NITRO-p-PHENYLENEDIAMINE**
Jerome Marshall Cinnamon and Morton A. Westman,
North Caldwell, N.J., assignors to Shulton, Inc., Clifton, N.J.
No Drawing. Filed Sept. 1, 1967, Ser. No. 664,937
Int. Cl. C07c 87/62
U.S. Cl. 260—573                                7 Claims

ABSTRACT OF THE DISCLOSURE

This invention relates to novel compounds capable of producing striking colors in keratinacious material, especially live human hair. These compounds, which are N¹-aminoalkyl derivatives of 2-nitro-p-phenylenediamine containing an hydroxyalkyl group in the N⁴ position, are highly useful in preparing high fashion colors for hair dyeing. Certain of the compounds of this invention are especially useful for effecting a bluish-purple color. This type of compound has significant value in the dyeing of gray hair which has a yellow tint. The compounds of this invention cover a wide spectrum of colors and are used either alone, in combination or combined with other dyes for producing various shades of blond to dark brown or black.

BACKGROUND OF THE INVENTION

The compounds of this invention are employed for the dyeing of keratinacious materials and especially for dyeing live human hair. The compounds may be used alone, combined with other compounds of the invention or mixed with other known dyes. They have an excellent affinity for the live human hair, lose little color when exposed to light, exhibit excellent rubbing fastness and do not stain the scalp. In addition, peroxide additives, such as hydrogen peroxide, are not required for effecting dyeing of the hair or for fixation of the dye.

SUMMARY

The compounds of this invention have the formula:

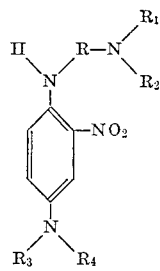

in which R is a saturated straight or branched chain divalent hydrocarbon radical; $R_1$ and $R_2$ is any combination of hydrogen, cyclohexyl, phenyl, a straight or branched chain alkyl group, an hydroxyalkyl group of 1 through 4 carbon atoms and 1 or 2 hydroxyl groups and an acyl group, desirably having less than 8 carbon atoms and preferably 2 through 4 carbon atoms, $R_1$ being hydrogen when $R_2$ is an acyl group; $R_3$ is hydrogen or an hydroxyalkyl group having 1 through 4 carbon atoms and 1 or 2 hydroxy groups; and $R_4$ is an hydroxyalkyl group having 1 through 4 carbon atoms and 1 or 2 hydroxyl groups.

With the exception of compounds containing an acylamino group, all of the compounds of this invention may be produced by reacting 4-halo-3-nitroaniline, such as 4-chloro-3-nitroaniline or 4-fluoro-3-nitroaniline, with a halohydrin in the presence of an acid acceptor or with an alkylene oxide. The reaction may be conducted in an aqueous lower alkyl monohydric alcohol, such as ethanol, isopropanol or n-propanol. The resulting compound is then reacted with an alkylenediamine having the formula:

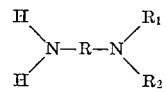

Desirably, the alkylenediamine contains 1 through 4 carbon atoms and 1 or 2 hydroxyl groups. It is also desirable that the halohydrin or alkylene oxide has not more than 4 carbon atoms. The halohydrin may be a chloro, bromo or iodohydrin. The acid acceptor may be an alkali metal or alkaline earth metal carbonate, oxide or hydroxide, such as sodium carbonate, calcium oxide or barium hydroxide.

Another method for producing certain compounds of this invention is to selectively reduce, in the presence of a platinum catalyst, the 4-nitro group of a 2,4-dinitroaminoalkylaniline having the formula:

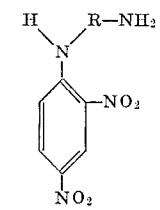

and reacting the resulting corresponding 2-nitro-p-phenylenediamine with a halohydrin and an acid acceptor or with an alkylene oxide. The halohydrin, acid acceptor and alkylene oxide are of the same type employed for the production of the compounds of this invention as previously described. The compounds produced are N⁴,N⁴-bis(hydroxyalkyl) - N¹ - [bis(hydroxyalkyl)amino]alkyl-2-nitro-p-phenylenediamines.

Compounds of this invention containing an acylamino group may be produced by reacting a 2,4-dinitroaminoalkylaniline having the formula:

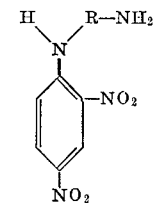

with an acylating agent in which the acyl group preferably has not more than 4 carbon atoms, such as acetic anhydride or propionic anhydride, or an acyl chloride, such as acetyl chloride or butyryl chloride. The resulting acylated compound is then selectively reduced in the presence of a platinum catalyst to produce an acylated 2-nitro-p-phenylenediamine. The acylated 2-nitro-p-phenylenediamine is then reacted with a halohydrin in the presence of an acid acceptor or with an alkylene oxide. The halohydrin, alkylene oxide and acid acceptor are of the same type as employed in the method for producing the compounds of this invention which do not contain an acylamino group. The acylated compounds produced may be deacylated by refluxing with concentrated hydrochloric acid.

In an alternative process to produce N⁴,N⁴-bis(hydroxyalkyl)-N¹-[bis(hydroxyalkyl)amino]alkyl-2 - nitro-p-phenylenediamine, there is reacted an N¹-aminoalkyl-N⁴,N⁴-bis(hydroxyalkyl) - 2 - nitro - p - phenylendiamine with a halohydrin in the presence of an acid acceptor or with an alkylene oxide. The halohydrin, acid acceptor and alkylene oxide are the same types as employed in the first preparation of the compounds of this invention previously described.

The alkylenediamine employed in the preparation of the compounds of this invention are prepared by known methods and many are commercially available. These preparations are described in the following references:

D. E. Pearson, W. H. Jones and A. C. Cope, J. Am. Chem. Soc., 68, 1225–9 (1946);
German Pat. No. 561,156 (Dec. 19, 1930);
R. B. Wagner and H. D. Zook, Synthetic Organic Chemistry, John Wiley & Sons, Inc., New York, 1953, 3rd printing 1961, pp. 691–693; and
L. J. Kitchen and C. D. Pollard, J. Org. Chem., 8, 342–3 (1943).

The following examples illustrate the production of the new dyes and their use in dyeing.

EXAMPLE I $N^1$-(2-acetamidoethyl)-$N^4,N^4$-bis(2-hydroxyethyl)-2-nitro-p-phenylenediamine (A) N-(2-aminoethyl) - 2,4 - dinitroaniline.—Granular 2,4-dinitrochlorobenzene (405.1 g., 2.0 moles) was added over a one hour interval with stirring to ethylenediamine (1202.0 g., 20.0 moles) maintained at a temperature of 40–60° C. The reaction mixture was allowed to cool to room temperature, neutralized with sodium carbonate (212 g., 2 moles) and poured into an ice/water mixture (16 liters). The mixture was filtered and air-dried to give 439 g. (97.1% yield) of crude yellow product, M.P. 87–93° C. The analytical sample was recrystallized from a mixture of ethyl acetate and isopropanol as yellow needles, M.P. 90–92° C.

Analysis.—Calc'd for $C_8H_{10}N_4O_4$ (percent): C, 42.48; H, 4.46; N, 24.77. Found (percent): C, 42.55; H, 4.33; N, 24.61.

(B) N-(2-acetamidoethyl)-2,4-dinitroaniline.—Acetic anhydride (157 ml., 1.7 moles) was added dropwise with stirring to finely divided N-(2-aminoethyl)-2,4-dinitroaniline (67.9 g., 0.30 mole) and allowed to stand for ½ hour. The mixture was cautiously stirred into an equal volume of cold water whereupon the amide separated as a yellow solid. The product was filtered, washed free of acetic acid with cold water and air-dried to give 79.4 g. (98.7% yield) of yellow needles, M.P. 174–176° C. The analytical sample was recrystallized from ethanol as yellow needles, M.P. 177–178.5° C.

Analysis.—Calc'd for $C_{10}H_{12}N_4O_5$ (percent): C, 44.78; H, 4.51; N, 20.89. Found (percent): C, 45.01; H, 4.63; N, 21.02.

(C) $N^1$-(2-acetamidoethyl) - 2 - nitro-p-phenylenediamine.—A solution of N-(2-acetamidoethyl)-2,4-dinitroaniline (13.4 g., 0.0050 mole) in a mixture of hydrochloric acid (40 ml.) and absolute ethanol (210 ml.) was catalytically reduced over 5% platinum-on-carbon (0.6 g.) under 3 atmospheres of hydrogen. The catalyst was removed by filtration and the filtrate was made basic with excess sodium carbonate to give 4.9 g. (42% yield) of lusterous bronze platelets, M.P. 157–158° C. The analytical sample was recrystallized from ethyl acetate as lusterous bronze platelets, M.P. 158–159° C.

Analysis.—Calc'd for $C_{10}H_{14}N_4O_3$ (percent): C, 50.41; H, 5.92; N, 23.52. Found (percent): C, 50.41; H, 5.93; N, 23.45.

(D) $N^1$-(2-acetamidoethyl) - $N^4,N^4$ - bis(2-hydroxyethyl)-2-nitro-p-phenylenediamine dihydrochloride. — An excess of ethylene oxide was passed through a refluxing mixture of $N^1$-(2-acetamidoethyl)-2-nitro-p-phenylenediamine (23.8 g., 0.10 mole), cuprous chloride (0.05 g.), iodine (0.05 g.), n-propanol (200 ml.) and water (25 ml). After three days, the reaction mixture was filtered and evaporated on a water bath under reduced pressure to give an oily residue. The residue was dissolved in absolute ethanol and dry hydrogen chloride was passed through the solution to give 29.3 g. (73.5% yield) of granular yellow solid, M.P. 171–173° C. The analytical sample was recrystallized from absolute ethanol as a granular yellow solid, M.P. 182.5–183° C.

(E) Dyeing of hair with $N^1$-(2-acetamidoethyl)-$N^4,N^4$-bis(2-hydroxyethyl) - 2 - nitro-p-phenylenediamine.—A solution of $N^1$-(2-acetamidoethyl)-$N^4,N^4$-bis(2-hydroxyethyl)-2-nitro-p-phenylenediamine dihydrochloride (2.0 g.) in water (80 ml.) and propylene glycol (10 ml.) was titrated with 2% aqueous ammonium hydroxide to a pH in the range of 2 through 11, preferably 7 through 9, and the volume was adjusted to 100 ml. with water. White hair immersed in this solution for 20 minutes at 20 to 30° C., then thoroughly rinsed and dried, was dyed a blue-violet color.

EXAMPLE II $N^1$-(2-aminoethyl)-$N^4,N^4$-bis(2-hydroxyethyl)-2-nitro-p-phenylenediamine (A) $N^1$-(2-aminoethyl) - $N^4,N^4$ - bis(2-hydroxyethyl)-2-nitro-p-phenylenediamine.—A solution of $N^1$-(2-acetamidoethyl)-$N^4,N^4$-bis(2 - hydroxyethyl)-2-nitro-p-phenylenediamine dihydrochloride (39.33 g., 0.10 mole) in hydrochloric acid (150 ml.) was refluxed for 7 hours. The solution was evaporated to dryness on a water bath under reduced pressure and the residue was triturated with a saturated solution of hydrogen chloride in absolute ethanol (50 ml.) to give 12.7 g. (35.6% yield) of granular brown solid, M.P. 205–206° C. The analytical sample was recrystallized several times from methanol as tan needles, M.P. 205–206° C.

Analysis.—Calc'd for $C_{12}H_{22}Cl_2N_4O_2$ (percent): C, 40.43; H, 6.21; Cl, 19.85; N, 15.68. Found (percent): C, 40.30; H, 6.23; Cl, 20.08; N, 15.90.

(B) Dyeing of hair with $N^1$-(2-aminoethyl)-$N^4,N^4$-bis(2-hydroxyethyl) - 2 - nitro-p-phenylenediamine.—A solution of $N^1$-(2-aminoethyl) - $N^4,N^4$ - bis(2-hydroxyethyl)-2-nitro-p-phenylenediamine dihydrochloride (1.0 g.), hydroxycellulose (5.0 g.) and "Triton" X–100 (0.5 g.), in water (80 ml.) and ethanol (5 ml.) was titrated with triethanolamine to a pH in the range of 2 through 11, preferably 7 through 9, and the volume adjusted to 100 ml. with water. White hair immersed in this solution for 20 minutes at 20 to 30° C., then thoroughly rinsed and dried, was dyed a dark red-violet color.

EXAMPLE III $N^4,N^4$-bis(2-hydroxyethyl)-$N^1$-{2-[bis(2-hydroxyethyl)amino]ethyl}-2-nitro-p-phenylenediamine (A) $N^1$-(2-aminoethyl) - 2 - nitro-p-phenylenediamine dihydrochloride.—A solution of N-(2-aminoethyl)-2,4-dinitroaniline (33.9 g., 0.15 mole) in a mixture of hydrochloric acid (50 ml.) and absolute ethanol (900 ml.) was catalytically reduced over 5% platinum-on-carbon until the theoretical amount of hydrogen (0.45 mole) at 3 atmospheres was absorbed. The catalyst was removed by filtration and the filtrate was cooled at 0° C. to give 37.3 g. (92.3% yield) of bronze colored solid, M.P. 203–215° C. The analytical sample was recrystallized several times from methanol as tan needles, M.P. 252–254° C.

Analysis.—Calc'd for $C_8H_{14}Cl_2N_4O_2$ (percent): C, 35.70; H, 5.24; Cl, 26.35; N, 20.82. Found (percent): C, 35.72; H, 5.31; Cl, 26.31; N, 20.59.

(B) $N^4,N^4$-bis(2-hydroxyethyl - $N^1$ - {2-[bis(2-hydroxyethyl)amino]ethyl} - 2 - nitro-p-phenylenediamine dihydrochloride methanolate.—A suspension of $N^1$-(2-aminoethyl)-2-nitroaniline dihydrochloride (14.1 g., 0.0524 mole) in ethanol (245 ml.) was neutralized with sodium carbonate (5.6 g., 0.053 mole) and filtered free of inorganic salts. An excess of ethylene oxide was passed through a mixture of the filtrate, cuprous chloride (0.02 g.) and iodine (0.02 g.). After 17 hours, the reaction mixture was filtered and the solvent was evaporated on a water bath under reduced pressure to give an oily residue which was dissolved in methanol. Dry hydrogen chloride was passed through the solution to give 3.6 g. (14% yield) of tan solid, M.P. 150–153° C. The analytical sample was recrystallized from methanol as yellow needles, M.P. 151–153° C.

*Analysis.*—Calc'd for $C_{17}H_{34}Cl_2N_4O_7$ (percent): C, 42.77; H, 7.18; Cl, 14.85; N, 11.74. Found (percent): C, 42.35; H, 7.21; Cl, 14.92; N, 11.87.

(C) Dyeing of hair with $N^4,N^4$-bis(2-hydroxyethyl)-$N^1$-{2 - [bis(2 - hydroxyethyl)amino]ethyl} - 2 - nitro-p-phenylenediamine.—A solution of $N^4,N^4$-bis(2-hydroxyethyl) - $N^1$ - {2 - [bis(2 - hydroxyethyl)amino]ethyl}-2-nitro-p-phenylenediamine dihydrochloride methanolate (3.0 g.) and "Triton" X–100 (0.5 g.) in water (90 ml.) was titrated with 2% aqueous sodium hydroxide solution to a pH in the range of 2 through 11, preferably 7 through 9, and the volume adjusted to 100 ml. with water. White hair immersed in this solution for 30 minutes at 35° C., then thoroughly rinsed and dried, was dyed a deep violet color.

EXAMPLE IV $N^1$-(3-aminopropyl)-$N^4,N^4$-bis(2-hydroxyethyl)-2-nitro-p-phenylenediamine (A) 4-chloro-N-bis(2-hydroxyethyl)-3 - nitroaniline.—An excess of ethylene oxide was passed through a refluxing mixture of 4-chloro-3-nitroaniline (10.0 g., 0.058 mole), cuprous chloride (0.02 g.), iodine (0.02 g.), isopropanol (80 ml.) and water (100 ml.). After 5 days the reaction mixture was filtered, evaporated to dryness on a water bath under reduced pressure and the residue was recrystallized from water to give 11.2 g. (74% yield) of yellow platelets, M.P. 97–103° C. The analytical sample was recrystallized several times from water as yellow platelets, M.P. 105–108° C.

*Analysis.*—Calc'd for $C_{10}H_{13}ClN_2O_4$ (percent): C, 46.07; H, 5.03; Cl, 13.60; N, 10.75. Found (percent): C, 45.75; H, 5.00; Cl, 13.74; N, 10.76.

(B) $N^1$-(3-aminopropyl) - $N^4,N^4$-bis(2-hydroxyethyl)-2-nitro-p-phenylenediamine dihydrochloride.—A mixture of 4-chloro-N-bis(2-hydroxyethyl)-3-nitroaniline 2.6 g., 0.10 mole) and 1,3-diaminopropane (25 g., 0.34 mole) was refluxed for 20 hours. The mixture was evaporated to dryness on a water bath under reduced pressure and the residue was extracted with absolute alcohol and filtered. The filtrate was diluted with methanol and dry hydrogen chloride was introduced into the solution to give 2.8 g. (76% yield) of tan powder, M.P. 228° C. with decomposition.

(C) Dyeing of hair with $N^1$-(3-aminopropyl)-$N^4,N^4$-bis(2-hydroxyethyl)-2-nitro-p-phenylenediamine.—A solution of $N^1$-(3-aminopropyl)-$N^4,N^4$-bis(2-hydroxyethyl)-2-nitro-p-phenylenediamine dihydrochloride (2.0 g.) in water (90 ml.) was titrated with ammonium hydroxide to a pH in the range of 2 through 11, preferably 7 through 9, and the volume was adjusted to 100 ml. with water. White hair immersed in this solution for 20 minutes at 20 to 30° C., then thoroughly rinsed and dried, was dyed a medium violet color.

EXAMPLE V $N^4,N^4$-bis(2-hydroxyethyl)-$N^1$-{2-[bis(3-hydroxypropyl)amino]ethyl}-2-nitro-p-phenylenediamine (A) $N^4,N^4$ - bis(2-hydroxyethyl) - $N^1$ - {2-[bis(3-hydroxypropyl)amino]ethyl}-2-nitro-p-phenylenediamine.—A mixture of $N^1$-(2-aminoethyl) - $N^4,N^4$ - bis(2 - hydroxyethyl)-2-nitro-p-phenylenediamine dihydrochloride (3.57 g., 0.010 mole), sodium carbonate (3.18 g., 0.030 mole), 3-chloropropanol (2.84 g., 0.03 mole), water (7 ml.) and isopropanol (20 ml.) was refluxed for 20 hours and filtered The mixture was evaporated on a water bath under reduced pressure and the residue was extracted with isopropanol and filtered. The filtrate was evaporated as above to give 2.3 g. (49% yield) of a deep blue oil.

(B) Dyeing of hair with $N^4,N^4$-bis(2-hydroxyethyl)-$N^1$-{2-[bis(3-hydroxypropyl)amino]ethyl} - 2 - nitro-p-phenylenediamine.—A solution of $N^4,N^4$-bis(2-hydroxyethyl)-$N^1$-{2-[bis(3 - hydroxypropyl)amino]ethyl} - 2 - nitro-p-phenylenediamine (0.5 g.) in water (99.5 ml.) gave a slightly alkaline solution of pH 8.5. White hair immersed in this solution for 20 minutes at 20 to 30° C., then thoroughly rinsed and dried, was dyed a medium red-violet color.

EXAMPLE VI $N^1$-2-acetamidoethyl)-$N^4,N^4$-bis(2-hydroxypropyl)-2-nitro-p-phenylenediamine (A) $N^1$-(2 - acetamidoethyl) - $N^4,N^4$-bis(2-hydroxypropyl)-2-nitro-p-phenylenediamine.—A mixture of $N^1$-(2-acetamidoethyl)-2-nitro-p-phenylenediamine (23.8 g., 0.10 mole), propylene oxide (17.4 g., 0.30 mole), cuprous chloride (0.05 g.), iodine (0.05 g.), isopropanol (200 ml.) and water (25 ml.) was refluxed for 4 weeks. A drop of the reaction mixture was subjected to thin layer chromatography on silica gel using 5% methanol in chloroform as the developing solvent system. The developed plate revealed two spots of approximately equal size: a blueish-purple spot which was the dihydroxyalkylated product and a reddish-purple spot which was the monohydroxyalkylated material. The reaction mixture was filtered and the filtrate was evaporated on a water bath under reduced pressure to give a dark purple oily residue. A portion of this residue (0.5 g.) was chromatographed on 4 feet of a 4 inch diameter column of silica gel using 10% methanol in chloroform as eluting solvent. The solvent containing the first band (blueish-purple) was evaporated under reduced pressure on a water bath to give a dark blueish-purple oily residue.

EXAMPLE VII $N^1$-(2-acetamidoethyl)-$N^4$-(2-hydroxypropyl)-2-nitro-p-phenylenediamine (A) $N^1$ - (2-acetamidoethyl)-$N^4$-(2-(hydroxypropyl)-2-nitro-p-phenylenediamine.—The elution of the column as described in Example VI(A) was continued. The solvent containing the second band (dark red) was evaporated under reduced pressure on a water bath to give a dark reddish-purple oily residue.

EXAMPLE VIII $N^4,N^4$-bis(2-hydroxyethyl)-$N^1$-[3-(dimethylamino) propyl]-2-nitro-p-phenylenediamine (A) $N^4,N^4$-bis(2-hydroxyethyl) - $N^1$-[3 - (dimethylamino)propyl]-2-nitro-p-phenylenediamine.—A mixture of 4-chloro-N-bis(2-hydroxyethyl)-3-nitroaniline (2.6 g., 0.01 mole) and N,N-dimethyl-1,3-propanediamine (31 g., 0.3 mole) was refluxed for 20 hours. The excess N,N-dimethyl-1,3-propanediamine was evaporated on a water bath under reduced pressure and the oily resdue was extracted with absolute ethanol and filtered. The filtrate was evaporated as above to give a dark blueish-purple oily residue.

EXAMPLE IX $N^1$-(2-acetamidoethyl)-$N^4$-(2,3-dihydroxypropyl)-2-nitro-p-phenylenediamine (A) $N^1$-(2-acetamidoethyl)-$N^4$-(2,3-dihydroxypropyl)-2-nitro-p-phenylenediamine.—A mixture of $N^1$-(2-acetamidoethyl)-2-nitro-p-phenylenediamine (11.9 g., 0.05 mole), 3-chloro-1,2-propanediol (12.2 g., 0.11 mole), sodium carbonate (6.4 g., 0.06 mole), isopropanol (100 ml.) and water (20 ml.) was refluxed for 12 hours. A drop of the reaction mixture was subjected to thin layer chromatography on silica gel using 5% methanol in chloroform as the developing solvent system. The developed plate revealed two spots of approximately equal size: a reddish-purple spot which was the mono(dihydroxyalkylated) product and a blueish-purple spot which was the bis(dihydroxyalkylated) material. The reaction mixture was filtered and the filtrate was evaporated on a water bath under reduced pressure to give a dark purple oily residue. A portion of the residue (0.5 g.) was chromatographed on 4 feet of a 4 inch diameter column of silica gel using 10% methanol in chloroform as eluting solvent. The solvent containing the first band (dark red) which passed through the column was evaporated under reduced pressure on a water bath to give a reddish-purple oily residue.

EXAMPLE X $N^1$-(2-acetamidoethyl)-$N^4$,$N^4$-bis(2,3-dihydroxypropyl)-2-nitro-p-phenylenediamine (A) $N^1$ - (2-acetamidoethyl)-$N^4$,$N^4$-bis(2,3-dihydroxypropyl)-2-nitro-p-phenylenediamine.—The elution of the column as described in Example IX(A) was continued. The solvent containing the second band (blueish-purple) was evaporated under reduced pressure on a water bath to give a dark blueish-purple oily residue.

The title compound was also prepared by continuing the reaction described in IX(A) using a greater excess 3-chloro-1,2-propanediol and sodium carbonate. A mixture of $N^1$ - (2-acetamidoethyl) - 2 - nitro-p-phenylenediamine (11.9 g., 0.05 mole), 3-chloro-1,2-propanediol (22.1 g., 0.20 mole), sodium carbonate (10.6 g., 0.10 mole), isopropanol (100 ml.) and water (20 ml.) was refluxed for 22 hours and filtered. The filtrate was evaporated on a water bath under reduced pressure to give a dark blueish-purple oily residue. The residue was recrystallized from a mixture of ethyl acetate and absolute ethanol to give 4.5 g. (23% yield) of bronzing-blue needles, M.P. 151–154° C.

(B) Dyeing of hair with $N^1$-(2-acetamidoethyl)-$N^4$,$N^4$-bis(2,3 - dihydroxypropyl)-2-nitro-p-phenylenediamine.— A mixture of $N^1$-(2-acetamidoethyl)-$N^4$,$N^4$-bis(2,3-dihydroxypropyl)-2-nitro-p-phenylenediamine (1.0 g.), dispersed Violet 4 (Color Index designation) (1.0 g.), 4-nitro-p-phenylenediamine (0.04 g.), 2-nitro-p-phenylenediamine (0.02 g.), hydroxypropylmethyl cellulose (1.0 g.), octylphenoxypolyethoxy ethanol (0.5 g.), propylene glycol (0.50 g.) and water (80 ml.) was titrated with 2% aqueous ammonium hydroxide to pH 9, and the volume was adjusted to 100 ml. with water. White hair immersed in this solution for 40 minutes at 35° C., then thoroughly rinsed and dried, was dyed a medium brown color.

EXAMPLE XI $N^4$,$N^4$-bis(2-hydroxyethyl-$N^1$-[3-diethylamino)-propyl]-2-nitro-p-phenylenediamine (A) $N^4$,$N^4$ - bis(2 - hydroxyethyl) - $N^1$ - [3 - (diethylamino)propyl]-2-nitro-p-phenylenediamine. — A mixture of 4-chloro-N-bis(2-hydroxyethyl)-3-nitroaniline (2.6 g., 0.01 mole) and N,N-diethyl-1,3-propanediamine (39 g., 0.3 mole) was refluxed for 20 hours. The excess N,N-diethyl-1,3-propanediamine was evaporated on a water bath under reduced pressure and the oily residue was extracted with absolute ethanol and filtered. The filtrate was evaporated as above to give a dark blueish-purple oily residue.

EXAMPLE XII $N^1$-(4-aminobutyl)-$N^4$,$N^4$-bis(2-hydroxyethyl)-2-nitro-p-phenylenediamine (A) $N^1$-(4 - aminobutyl)-$N^4$,$N^4$-bis(2-hydroxyethyl)-2-nitro-p-phenylenediamine.—A mixture of 4-chloro-N-bis(2-hydroxyethyl)-3-nitroaniline (2.6 g., 0.01 mole) and 1,4-butanediamine (26.4 g., 0.3 mole) was heated at 110–120° C. for 24 hours. The excess 1,4-butanediamine was evaporated on a water bath under reduced pressure and the oily residue was extracted with absolute ethanol and filtered. The filtrate was evaporated as above to give a dark blueish-purple oily residue.

EXAMPLE XIII $N^1$-(8-aminooctyl)-$N^4$,$N^4$-bis(2-hydroxyethyl)-2-nitro-p-phenylenediamine (A) $N^1$-(8 - aminooctyl)-$N^4$,$N^4$-bis(2-hydroxyethyl)-2-nitro-p-phenylenediamine.—A mixture of 4-chloro-N-bis(2-hydroxyethyl)-3-nitroaniline (2.6 g., 0.01 mole) and 1,8-octanediamine (43.4 g., 0.3 mole) was heated at 110–120° C. for 24 hours. The excess 1,8-octanediamine was evaporated on a water bath under reduced pressure and the oily residue was extracted with absolute ethanol and filtered. The filtrate was evaporated as above to give a dark blueish-purple oily residue.

EXAMPLE XIV $N^4$,$N^4$-bis(2-hydroxyethyl)-$N^1$-{2-[5-(diethylamino)]pentyl}-2-nitro-p-phenylenediamine (A) $N^4$,$N^4$ - bis(2 - hydroxyethyl)-$N^1$-{2-[5-(diethylamino)]pentyl}-2-nitro-p-phenylenediamine.—A mixture of 4 - chloro - N - bis(2-hydroxyethyl) - 3 - nitroaniline (5.2 g., 0.02 mole) and N,N-diethyl-4-methyl-1,4-diaminobutane (31.6 g., 0.2 mole) was heated under a nitrogen atmosphere at 110–120° C. for one week. The excess N,N-diethyl-4-methyl-1,4-diaminobutane was evaporated on a water bath under reduced pressure and the oily residue was extracted with absolute ethanol and filtered. The filtrate was evaporated as above to give a dark blueish-purple oily residue.

EXAMPLE XV $N^4$,$N^4$-bis(2-hydroxyethyl)-$N^1$-{3-[(2-hydroxyethyl)amino]propyl}-2-nitro-p-phenylenediamine (A) $N^4$,$N^4$-bis(2 - hydroxyethyl) - $N^1$ - {3 - [(2-hydroxyethyl)amino]propyl} - 2 - nitro - p - phenylenediamine.—A mixture of 4 - chloro-N-bis(2-hydroxyethyl)-3 - nitroaniline (2.6 g., 0.01 mole) and N - (2 - hydroxyethyl) - 1,3 - propanediamine (35.5 g., 0.30 mole) was heated under a nitrogen atmosphere at 110–120° C. for one week. The excess N-(2-hydroxyethyl)-1,3-propanediamine was evaporated on a water bath under reduced pressure and the oily residue was extracted with absolute ethanol and filtered. The filtrate was evaporated as above to give a dark blueish-purple oily residue.

EXAMPLE XVI $N^4$,$N^4$-bis(2-hydroxyethyl)-$N^1$-{2-[(2-hydroxy-2-methylpropyl)amino]ethyl}-2-nitro-p-phenylenediamine (A) $N^4$,$N^4$-bis(2-hydroxyethyl)-$N^1$-{2 - [(2 - hydroxy-2 - methylpropyl)amino]ethyl} - 2 - nitro - p - phenylenediamine.—A mixture of 4 - chloro - N - bis (2-hydroxyethyl) - 3 - nitroaniline (2.6 g., 0.01 mole) and N - (2-hydroxy - 2 - methylpropyl)ethylenediamine (37 g., 0.30 mole) was heated under a nitrogen atmosphere at 110–120° C. for one week. The excess N - (2-hydroxy-2-methylpropyl)ethylenediamine was evaporated on a water bath under reduced pressure and the oily residue was extracted with absolute ethanol and filtered. The filtrate was evaporated as above to give a dark blueish-purple oily residue.

EXAMPLE XVII $N^4$,$N^4$-bis(2-hydroxyethyl)-$N^1$-[2-(dimethylamino)ethyl]-2-nitro-p-phenylenediamine (A) $N^4$, $N^4$-bis(2 - hydroxyethyl) - $N^1$ - [2 - (dimethylamino)ethyl] - 2 - nitro - p - phenylenediamine.—A mixture of 4 - chloro - N - bis(2 - hydroxyethyl) - 3 - nitroaniline (5.2 g., 0.020 mole) and N,N-dimethylethylenediamine (26.4 g., 0.30 mole) was heated under a nitrogen atmosphere at 110–120° C. for one week. The excess N,N-dimethylethylenediamine was evaporated on a water bath under reduced pressure and the oily residue was extracted with absolute ethanol and filtered. The filtrate was evaporated as above to give a dark blueish-purple oily residue.

EXAMPLE XVIII

N$^4$,N$^4$-bis(2-hydroxyethyl)-N$^1$-[2-(diethylamino) ethyl]-2-nitro-p-phenylenediamine (A) N$^4$,N$^4$-bis(2 - hydroxyethyl) - N$^1$ - [2 - (diethylamino)ethyl] - 2 - nitro - p - phenylenediamine.—A mixture of 4 - chloro - N - bis(2 - hydroxyethyl) - 3 - nitroaniline (5.2 g., 0.020 mole) and N,N-diethylethylenediamine (34.9 g., 0.30 mole) was heated under a nitrogen atmosphere at 110–120° C. for one week. The excess N,N-diethylethylenediamine was evaporated on a water bath under reduced pressure and the oily residue was extracted with absolute ethanol and filtered. The filtrate was evaporated as above to give a dark blueish-purple oily residue.

EXAMPLE XIX

N$^4$,N$^4$-bis(2-hydroxyethyl)-N$^1$-[2-(diisopropylamino) ethyl]-2-nitro-p-phenylenediamine (A) N$^4$,N$^4$-bis(2 - hydroxyethyl) - N$^1$ - [2 - (diisopropylamino)ethyl] - 2 - nitro - p - phenylenediamine.— A mixture of 4 - chloro - N - bis(2 - hydroxyethyl) - 3 - nitroaniline (5.2 g., 0.020 mole) and N,N-diisopropylethylenediamine (28.9 g., 0.20 mole) was heated under a nitrogen atmosphere at 110–120° C. for one week. The excess N,N-diisopropylethylenediamine was evaporated on a water bath under reduced pressure and the oily residue was extracted with absolute ethanol and filtered. The filtrate was evaporated as above to give a dark blueish-purple oily residue.

EXAMPLE XX

N$^4$,N$^4$-bis(2-hydroxyethyl)-N$^1$-[3-(methylamino) propyl]-2-nitro-p-phenylenediamine (A) N$^4$,N$^4$-bis(2 - hydroxyethyl) - N$^1$ - [3 - (methylamino)propyl] - 2 - nitro - p - phenylenediamine.—A mixture of 4 - chloro - N - bis(2 - hydroxyethyl) - 3 - nitroaniline (5.2 g., 0.020 mole) and N - methyl - 1,3 - propanediamine (26.4 g., 0.30 mole) was heated at 110–120° C. for 24 hours. The excess N-methyl-1,3-propanediamine was evaporated on a water bath under reduced pressure and the oily residue was extracted with absolute ethanol and filtered. The filtrate was evaporated as above to give a dark blueish-purple oily residue.

EXAMPLE XXI

N$^4$,N$^4$-bis(2-hydroxyethyl)-N$^1$-[2-(methylamino) ethyl]-2-nitro-p-phenylenediamine (A) N$^4$,N$^4$-bis(2 - hydroxyethyl) - N$^1$ - [2 - (methylamino)ethyl] - 2 - nitro - p - phenylenediamine.—A mixture of 4 - chloro - N - bis(2 - hydroxyethyl) - 3 - nitroaniline (5.2 g., 0.020 mole) and N - methylethylenediamine (29.7 g., 0.40 mole) was heated under a nitrogen atmosphere at 110–120° C. for 3 days. The excess N-methylethylenediamine was evaporated on a water bath under reduced pressure and the oily residue was extracted with absolute ethanol and filtered. The filtrate was evaporated as above to give a dark blueish-purple oily residue.

EXAMPLE XXII

N$^4$,N$^4$-bis(2-hydroxyethyl)-N$^1$-[2-(ethylamino)ethyl]-2-nitro-p-phenylenediamine (A) N$^4$,N$^4$-bis(2-hydroxyethyl) - N$^1$ - [2-(ethylamino) ethyl]-2-nitro-p-phenylenediamine.—A mixture of 4-chloro-N-bis(2 - hydroxyethyl)-3-nitroaniline (5.2 g., 0.020 mole) and N-ethylethylenediamine (26.4 g., 0.30 mole) was heated under a nitrogen atmosphere at 110–120° C. for 3 days. The excess N-ethylethylenediamine was evaporated on a water bath under reduced pressure and the oily residue was extracted with absolute ethanol and filtered. The filtrate was evaporated as above to give a dark blueish-purple oily residue.

EXAMPLE XXIII

N$^4$,N$^4$-bis(2-hydroxyethyl)-N$^1$-[2-(Isopropylamino) ethyl]-2-nitro-p-phenylenediamine (A) N$^4$,N$^4$-bis(2 - hydroxyethyl)-N$^1$-(isopropylamino) ethyl]-2-nitro-p-phenylenediamine.—A mixture of 4-chloro-N-bis(2 - hydroxyethyl)-3-nitroaniline (5.2 g., 0.020 mole) and N-isopropylethylenediamine (30.7 g., 0.30 mole) was heated under a nitrogen atmosphere at 110–120° C. for 3 days. The excess N-isopropylethylene diamine was evaporated on a water bath under reduced pressure and the oily residue was extracted with absolute ethanol and filtered. The filtrate was evaporated as above to give a dark blueish-purple oily residue.

EXAMPLE XXIV

N$^1$-(2-anilinoethyl)-N$^4$,N$^4$-bis(2-hydroxyethyl)-2-nitro-p-phenylenediamine (A) N$^1$-(2-anilinoethyl)-N$^4$,N$^4$-bis(2 - hydroxyethyl)-2-nitro-p-phenylenediamine.—A mixture of 4-chloro-N-bis(2-hydroxyethyl)-3-nitroaniline (5.2 g., 0.020 mole) and N-phenylethylenediamine (27.2 g., 0.20 mole) was heated under a nitrogen atmosphere at 110–120° C. for one week. The excess N-phenylethylenediamine was evaporated on a water bath under reduced pressure and the oily residue was extracted with absolute ethanol and filtered. The filtrate was evaporated as above to give a dark blueish-purple oily residue.

EXAMPLE XXV

N$^4$,N$^4$-bis(2-hydroxyethyl)-N$^1$-{2-[(2-hydroxyethyl) amino]ethyl}-2-nitro-p-phenylenediamine (A) N$^4$,N$^4$-bis(2-hydroxyethyl) - N$^1$ - {2-[(2-hydroxyethyl)amino]ethyl}-2-nitro-p-phenylenediamine.—A mixture of 4-chloro-N-bis(2-hydroxyethyl)-3-nitroaniline (5.2 g., 0.020 mole) and N-(2-hydroxyethyl)ethylenediamine (31.2 g., 0.30 mole) was heated at 110–120° C. for 16 hours. The excess N-(2-hydroxyethyl)ethylenediamine was evaporated on a water bath under reduced pressure and the oily residue was extracted with absolute ethanol and filtered. The filtrate was evaporated as above to give a dark blueish-purple oily residue.

EXAMPLE XXVI

N$^1$-(12-aminododecyl)-N$^4$,N$^4$-bis(2-hydroxyethyl)-2-nitro-p-phenylenediamine (A) N$^1$-(12-aminododecyl)-N$^4$,N$^4$-bis(2-hydroxyethyl)-2-nitro-p-phenylenediamine.—A mixture of 4-chloro-N-bis(2-hydroxyethyl) 3-nitroaniline (5.2 g., 0.020 mole) and 1,12-dodecanediamine (30 g., 0.15 mole) was heated at 110–120° C. for 16 hours. The excess 1,12-dodecanediamine was evaporated on a water bath under reduced pressure and the oily residue was extracted with absolute ethanol and filtered. The filtrate was evaporated as above to give a dark blueish-purple oily residue.

EXAMPLE XXVII

N$^4$,N$^4$-bis(2-hydroxyethyl)-N$^1$-[2-cyclohexylamino) ethyl]-2-nitro-p-phenylenediamine (A) N$^4$,N$^4$-bis(2-hydroxyethyl) - N$^1$-[2-(cyclohexylamino) ethyl]-2-nitro-p-phenylenediamine.—A mixture of 4-chloro-N-bis(2 - hydroxyethyl)-3-nitroaniline (5.2 g., 0.020 mole) and N-cyclohexylethylenediamine (28.5 g., 0.20 mole) was heated under a nitrogen atmosphere at 110–120° C. for one week. The excess N-cyclohexylethylenediamine was evaporated on a water bath under reduced pressure and the oily residue was extracted with absolute ethanol and filtered. The filtrate was evaporated as above to give a dark blueish-purple oily residue.

What is claimed is:
1. A compound having the formula:

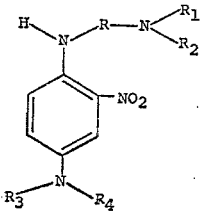

in which R is a saturated straight or branched chain divalent hydrocarbon radical of 1–4 carbon atoms; $R_1$ and $R_2$ is any combination of hydrogen, cyclohexyl, phenyl, a straight or branched chain alkyl group and an hydroxyalkyl group of 1 through 4 carbon atoms and 1 or 2 hydroxy groups, when $R_1$ is hydrogen, $R_2$ is other than hydrogen; $R_3$ is hydrogen or an hydroxyalkyl group having 1 through 4 carbon atoms and 1 or 2 hydroxy groups; and $R_4$ is an hydroxyalkyl group having 1 through 4 carbon atoms and 1 or 2 hydroxy groups.

2. A compound in accordance with claim 1, said compound being $N^4,N^4$-bis(2-hydroxyethyl)-$N^1$-{2-[bis(2-hydroxyethyl)amino]ethyl}-2-nitro-p-phenylenediamine.

3. A compound in accordance with claim 1, said compound being $N^4,N^4$-bis(2-hydroxyethyl)-$N^1$-{2-[bis(3-hydroxypropyl)amino]ethyl}-2-nitro-p-phenylenediamine.

4. A compound in accordance with claim 1, said compound being $N^4,N^4$-bis(2-hydroxyethyl)-$N^1$-[3-(dimethylamino)propyl]-2-nitro-p-phenylenediamine.

5. A compound in accordance with claim 1, said compound being $N^4,N^4$-bis(2-hydroxyethyl)-$N^1$-[3-diethylamino)propyl]-2-nitro-p-phenylenediamine.

6. A compound in accordance with claim 1, said compound being $N^1$-(2-anilinoethyl)-$N^4,N^4$-bis(2-hydroxyethyl)-2-nitro-p-phenylenediamine.

7. A compound in accordance with claim 1, said compound being $N^4,N^4$-bis-(2-hydroxyethyl)-$N^1$-[2-(cyclohexylamino)ethyl]-2-nitro-p-phenylenediamine.

References Cited
FOREIGN PATENTS

| | | | |
|---|---|---|---|
| 6610759 | 2/1967 | Netherlands | 260—573 |
| 758,111 | 5/1967 | Canada | 260—556 |

HENRY R. JILES, Primary Examiner

H. I. MOATZ, Assistant Examiner

U.S. Cl. X.R.

260—562 R, 577; 8—10.1

UNITED STATES PATENT OFFICE
CERTIFICATE OF CORRECTION

Patent No. 3,646,216　　　　　　Dated February 29, 1972

Inventor(s) Jerome Marshall Cinnamon et al

It is certified that error appears in the above-identified patent and that said Letters Patent are hereby corrected as shown below:

Rewrite claim 1 as follows

-- 1. A compound having the formula:

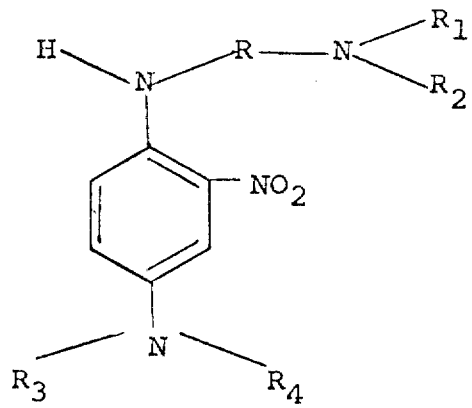

in which R is a saturated straight or branched chain alkylene radical of 1-4 carbon atoms; $R_1$ is hydrogen and $R_2$ is cyclohexyl or phenyl; $R_3$ is an hydroxyalkyl group having 1 through 4 carbon atoms and 1 or 2 hydroxy groups; and $R_4$ is an hydroxyalkyl group having through 4 carbon atoms and 1 or 2 hydroxy groups. --

UNITED STATES PATENT OFFICE
CERTIFICATE OF CORRECTION

Patent No. 3,646,216    Dated February 29, 1972

Inventor(s) Jerome Marshall Cinnamon et al    Page 2

It is certified that error appears in the above-identified patent and that said Letters Patent are hereby corrected as shown below:

Cancel claims 2, 3, 4 and 5. Renumber claims 6 and 7 as claims 2 and 3, respectively. In the heading to the printed specification, line 9, "7 Claims" should read -- 3 Claims --.
Signed and sealed this 21st day of November 1972.

(SEAL)
Attest:

EDWARD M. FLETCHER, JR.
Attesting Officer

ROBERT GOTTSCHALK
Commissioner of Patents